United States Patent [19]

Graham

[11] Patent Number: 4,707,150

[45] Date of Patent: Nov. 17, 1987

[54] FLUID PRESSURE ASSISTED ROTARY SHAFT SEAL WITH GROOVED SEAL WEDGE

[75] Inventor: Rodney E. Graham, Tustin, Calif.

[73] Assignee: Disposable Waste Systems, Inc., Santa Ana, Calif.

[21] Appl. No.: 3,334

[22] Filed: Jan. 14, 1987

[51] Int. Cl.$^4$ ............................................. F16C 33/78
[52] U.S. Cl. .................................... 384/481; 384/477; 384/487
[58] Field of Search ............... 384/481, 477, 487, 480, 384/142, 139, 144; 277/92, 93 SD

[56] References Cited

U.S. PATENT DOCUMENTS

| | | | |
|---|---|---|---|
| 3,218,110 | 11/1965 | Conner | 384/487 |
| 4,351,533 | 9/1982 | Moore | 384/481 |
| 4,482,194 | 11/1984 | Chambers | 384/480 |
| 4,527,915 | 7/1985 | Ikariishi et al. | 384/480 |

*Primary Examiner*—Lenard A. Footland
*Attorney, Agent, or Firm*—Sughrue, Mion, Zinn, Macpeak & Seas

[57] ABSTRACT

An annular elastomeric seal wedge of diamond shaped radial cross section under axial compression has opposite axial ends fitted within V-shaped cross section annular grooves within a radially projected shoulder of a bushing of a fluid pressure assisted rotary shaft seal and a similar V-shaped annular groove within the axial end face of the rotating seal race. A radial groove is formed within the side of the annular elastomeric seal wedge remote from the outside of the rotary shaft seal which receives an annular metal wave spring having axial undulations for axially biasing the rotating seal race in contact with the end face of a static seal race to form the dynamic shaft seal and for maintaining the positive pressure seal between the ends of the axial ends of the diamond shaped annular elastomeric seal wedge across the gap between the bushing radially projecting shoulder and the facing end of the rotating seal race.

10 Claims, 2 Drawing Figures

FLUID PRESSURE ASSISTED ROTARY SHAFT SEAL WITH GROOVED SEAL WEDGE

FIELD OF THE INVENTION

This invention relates to a fluid pressure assisted rotary shaft seal such as those using a replaceable insert cartridge which takes the wear, which partially defines a labyrinth preseal, which mounts the anti-friction bearing races, and which utilizes a seal wedge which resiliently, sealably couples the rotating race to a rotating bushing also partially defining the labyrinth preseal.

BACKGROUND OF THE INVENTION

The present invention is an improvement within a Fluid Pressure Assisted Rotary Shaft Seal With Labyrinth Bushing and Replacement Seal Sleeve Cartridge of U.S. Pat. No. 4,482,194 issued on Nov. 13, 1984, and assigned to the common assignee. The rotary shaft seal of that patent seals a shaft supported for rotation about its axis within a housing bore by an anti-friction bearing interposed between the shaft and the housing bore. The anti-friction bearing has an outer bearing race fixed to the housing and an inner bearing housing fixed to the shaft and rotating therewith. The seal assembly includes an annular bushing fixed to the shaft adjacent the anti-friction bearing and on the high pressure side of the housing. The seal assembly further includes an annular static seal race operatively fixed to the housing and having axially opposed end faces. An annular rotating seal race is operatively coupled to the shaft and has an end face in sealable contact with one opposing end face of the static seal race. A replaceable wear sleeve cartridge is sealably fixedly mounted to the housing bore. The annular labyrinth preseal bushing fixed to the shaft defines a labyrinth preseal between the labyrinth preseal bushing and the replaceable wear sleeve cartridge.

A compressed seal wedge resiliently couples the end face of the rotating seal race opposite that in abutment with the annular static seal race, to the presealed bushing. The seal wedge, which is preferably of diamond shaped cross-sectional configuration, has opposite axial ends compressably received within facing aligned V-shaped grooves within opposed faces of the bushing and the rotating seal race. The seal wedge which is preferably formed of an elastomeric material provides a biasing force to the annular rotating seal race to produce the correct closing force between the abutting seal race and faces. The seal wedge acts further as a non-clogging elastomeric drive spring while preventing liquid and foreign material from entering the interior of the housing at the gap between the rotating seal race and the bushing which supports the same. To ensure a positive fluid seal downstream of the labyrinth preseal, O-rings are incorporated between the replaceable wear sleeve cartridge and the housing, between the labyrinth preseal bushing and the rotating annular seal race and between the static seal race and the wear sleeve cartridge.

While the seal as set forth in U.S. Pat. No. 4,482,194 has proved to be very reliable in low pressure, low speed, sewage applications when incorporated in a comminutor, when such a comminutor is employed in paper and pulp processing at higher speed and higher applied pressure across the seal, relatively extreme seal face pressure occurs, resulting in deflection of the rotating and static faces, loss of seal at the interface, pitting and fraction of the rotating and static races at the interface as well as increased friction and high energy consumption during comminutor operation. Additionally, some loss of seal is experienced across the seal wedge and the seal wedge is subject to configurational distortions under the high pressure experienced by the seal wedge which tends to produce a set within the elastomeric material.

It is, therefore, a primary object of the invention to provide an improved rotary shaft seal of this type having extended seal life for the seal faces due to reduced friction therebetween, a reduction in energy consumption due to decreased drag on the seal faces, increased seal across the seal wedge, increased tolerance allowable for the race dimensions and retention of seal face contact under high shaft deflection.

DESCRIPTION OF THE PREFERRED EMBODIMENT

Figure 1:
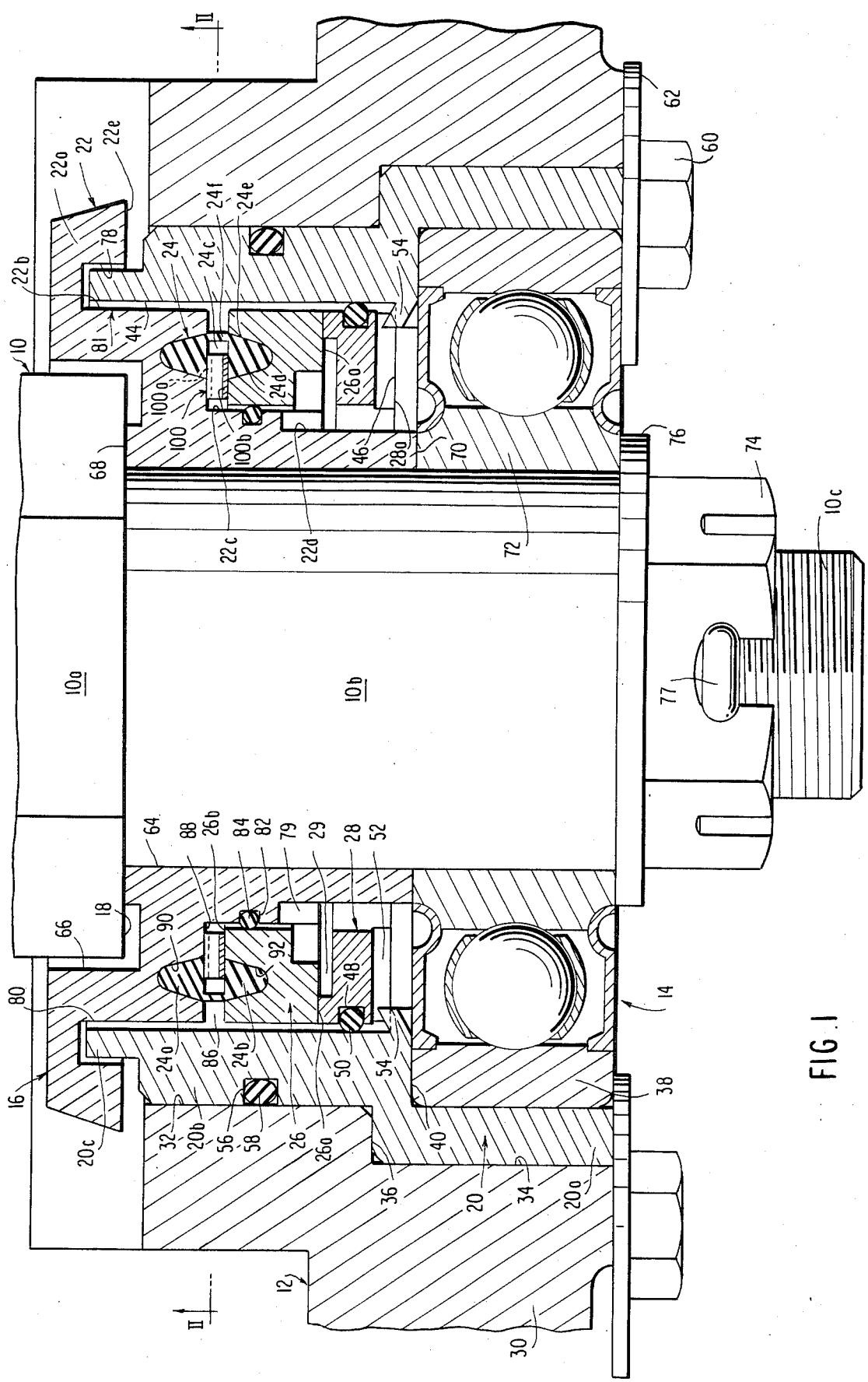
FIG. 1 is a longitudinal sectional view of a rotary shaft seal assembly forming a preferred embodiment of the present invention.
Figure 2:
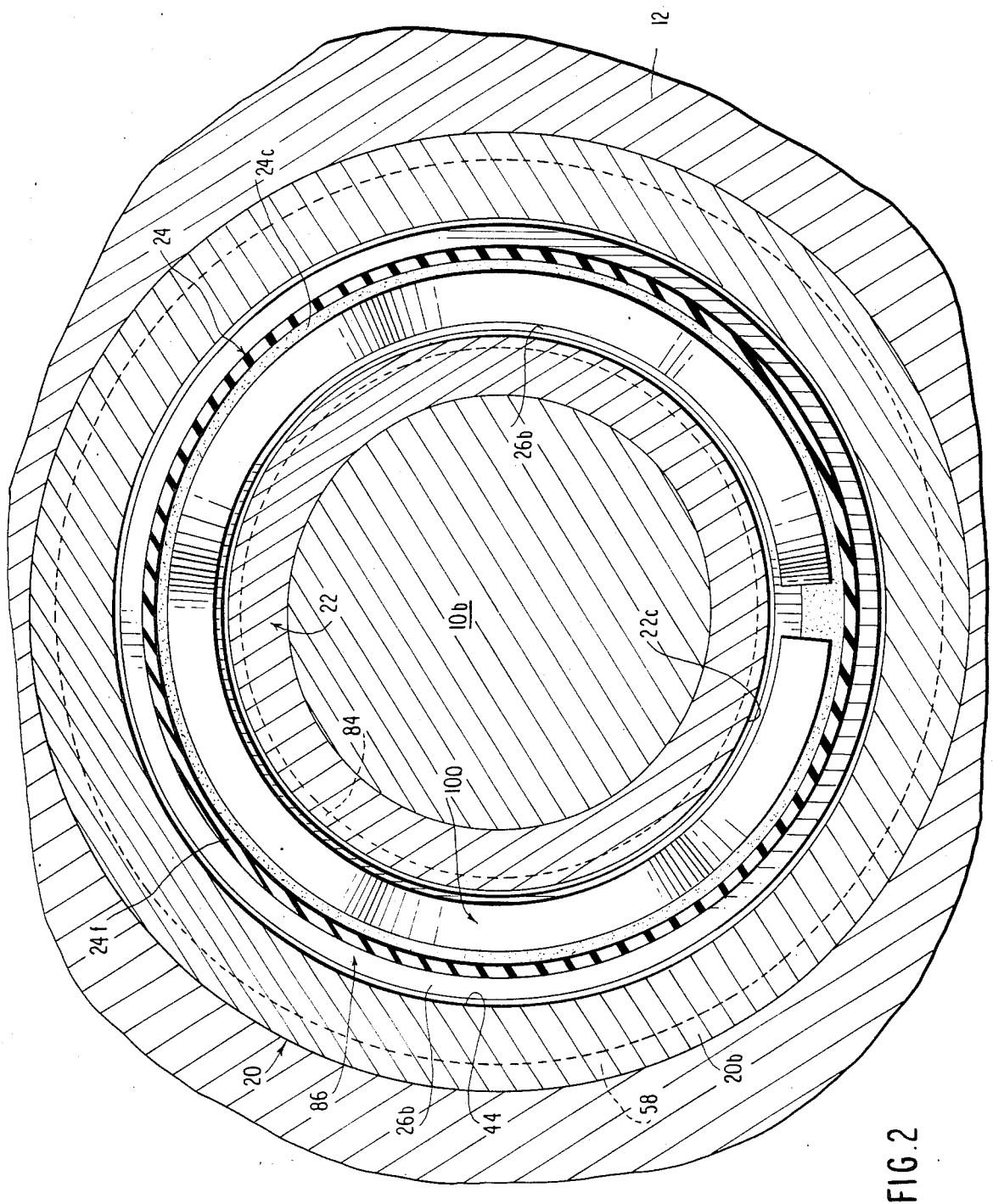
FIG. 2 is a radial sectional view of the rotary shaft seal assembly of FIG. 1, taken about line II—II.

The present invention is an improvement over U.S. Pat. No. 4,482,194 and the content of that patent is incorporated herein by reference. Additionally, the components of the rotary shaft assembly as described herein utilize the same numerical designations for components common to the assembly of that patent.

A shaft indicated generally at 10 is supported for rotation vertically about its axis within the housing 12 by means of an anti-friction bearing 14. The shaft includes a hexagonal cross section portion 10a and a first reduced diameter cylindrical cross-sectional portion 10b in the area of its support by anti-friction bearing 14 for rotation about its axis. Portions 10a, 10b define a radial shoulder 18. The shaft 10 terminates at the housing interior in a further reduced diameter threaded portion 10c. The rotary shaft assembly to which the invention is directed is indicated generally at 16 and is incorporated between the shaft reduced diameter portion 10b and housing 12.

The anti-friction bearing 14 is an element thereof. As in U.S. Pat. No. 4,482,194, the rotary shaft seal assembly 16 is comprised of major components: a replaceable wear sleeve indicated generally at 20, a labyrinth preseal bushing designated generally at 22, a seal wedge 24, a positive drive annular rotating seal race, indicated generally at 26, and a positive lock, annular static seal race, indicated generally at 28. Housing 12 includes integrally a transverse end wall 30 at one end through which is formed a vertical bore 32 and a coaxial counter bore 34; the bore 32 and counter bore 34 defining a shoulder 36. The replaceable wear sleeve cartridge 20 is fixedly mounted within the housing bore 32 and counter bore 34. The wear sleeve cartridge 20 includes radially offset portions to accommodate shoulder 36. The replaceable wear sleeve cartridge 20 is of cylindrical form including a radially enlarged offset portion 20a, which is offset from the reduced diameter portion 20b. Portion 20a has an outer diameter on the order of the diameter of counter bore 34 and is force fitted thereto. Portion 20a is provided with an inner diameter which is sized to the outer diameter of an outer race 38 of the anti-friction bearing 14. The race 38 may be force fitted to the interior of wear sleeve offset portion 20a. Thus, portion 20a fixedly mounts the outer race 38 of the anti-friction bearing. In that respect, offset portions 20a and 20b of the replaceable wear sleeve cartridge define a radial shoulder 40 against which the outer race 38 of the anti-friction bearing 14 abuts. The reduced diameter portion 20b of cartridge 20 has an outer diameter which is slightly smaller than the diameter of bore 32. The replaceable wear sleeve 20 cartridge includes a bore 42 over a short axial length at the connection between the radially offset portions 20a, 20b of that member and is further provided with a counter bore 44 in the direction of the exterior of the housing 12 and a further radially enlarged counter bore 45, towards the housing interior. Bore 42 and counter bore 45 define a radial shoulder 40, against which bearing race 38 abuts. A further shoulder or stop 46 is defined between bore 42 and counter bore 44, against which axially inner end face 28a of the static seal race 28 abuts. The annular static seal race is of ring form, and is of L-shaped radial cross-section. An annular outer end face 28b of the static seal race 28 is in surface abutment with the opposing inner axial end face 26a of the rotating annular seal race 26. The annular static seal race 28 is provided, on its outer periphery, with an annular groove 48 bearing an O-ring seal 50 which is compressed between the static seal race 28 and the opposing face of the replaceable wear sleeve 20 formed by counter bore 44 thereof. The O-ring seal additionally frictionally locks the annular static seal race 28 to the replaceable wear sleeve 20. The annular static seal race 28 is provided with diametrically opposed radial grooves or slots 52 at its axially inner end face 28a. These grooves receive respective locking tabs 54 which project axially beyond shoulder 46 of the replaceable wear sleeve cartridge 20 to prevent rotation of the static seal race 28 upon contacting the opposing face of the rotating seal race 26.

The outer periphery of the replaceable wear sleeve cartridge 20 is provided with an annular groove 56 which mounts a further O-ring seal 58 which is compressed within the groove and between the replaceable wear sleeve cartridge 20 and the bore 32 of the housing end wall 30. Mounting screws 60 bearing washers 62 penetrate the end wall 30 of housing 12 and are received within tapped holes (not shown) to fix the replaceable wear sleeve cartridge 20 in the position shown in FIG. 1. The washers 62 also maintain the bearing race 38 for bearing 14 against shoulder 40. The annular labyrinth preseal bushing 22 is of cylindrical form and has a bore 64 which is slightly larger than the first reduced diameter portion 10b of the shaft, on which it is concentrically positioned. Bushing 22 is provided with an axial, radially inner recess 66, to accommodate the hexagonal cross-sectional radially enlarged portion 10a of shaft 10. The recess 66 forms a radial shoulder 68 which abuts shoulder 18 of the shaft when mounted about the shaft portion 10b. The bushing is keyed to the shaft by recess 66, or otherwise. The opposite axial end 70 of bushing 22 abuts one end face of the anti-friction bearing inner race 72 of bearing 14. The anti-friction bearing inner race 72 has an inner diameter slightly larger than the diameter of shaft portion 10b which it concentrically surrounds. A hex nut 74 keyed by cotter pin 77 is mounted to the threaded terminal portion 10c of shaft 10 and abuts a washer 76 which is interposed between the hex nut 74 and the end face of the antifriction bearing inner race 72. Thus, the labyrinth preseal bushing is locked axially between the antifriction bearing inner race 72 and shaft shoulder 18.

The labyrinth preseal bushing 22 functions as the axially outer and radially inner member of the labyrinth preseal. It has a stepped outer configuration, FIG. 1, including a radially enlarged head or collar 22a, a first reduced diameter portion 22b, a further reduced diameter portion 22c, and a final reduced diameter portion 22d. Collar 22a includes an annular groove 78 within end face 22e which is of a larger radial width than the radial width of an axially projecting tip portion 20c of the replaceable wear sleeve cartridge 20. Further, the axial projecting tip portion 20c of the cartridge is of a length such that it terminates short of the bottom of the groove 78. Further, the diameter of reduced diameter portion 22b of the labyrinth preseal bushing 22 is somewhat less than the diameter of counter bore 44 of the replaceable wear sleeve cartridge 20. A tortuous labyrinth preseal passage 80 is thereby provided for any contaminant fluid medium attempting to reach, under pressure, the interior of housing 12. The tortuous labyrinth preseal passage 20 terminates at O-ring 50 and is cutoff from the interior of housing 12. Counter bore 44 of cartridge passage 20 terminates at O-ring 50 and is cutoff from the interior of housing 12. Counter bore 44 of cartridge 20 and reduced diameter portions 22c and 22d of the labyrinth preseal bushing 22 are spaced from each other radially and sized to partially define a dynamic seal cavity 79 therebetween.

The annular rotating seal race 26 is also a ring-like seal element, which in this case is of inverted L-shaped cross section and like the annular static seal race 28 is formed of a suitable metal. Its outer diameter is on the order of that of the annular static seal race 28 with its axially outer end face 26b being of a smaller radial width than that of its axially inner end face 26a. End face 26a abuts and rubs against the axially outer, radially narrow annular end face 28b of the annular static seal race 28. These two faces 26a and 28b form the dynamic seal of the assembly. Further, the static seal race 28 is recessed at 29 to form the narrow annular end face 28b while permitting the application of internal fluid pressure to the end face 26a of the annular rotating seal race 26. Its internal pressure functions to offset any pressure developed by external fluid which is applied to a small annular portion of the axially outer end face 26b lying radially outside to the seal wedge indicated generally at 24. An internal reverse pressure defined by recess 29 within annular static seal race 28 (or a similar recess within the opposing face of the annular rotating seal race 26), as shown, maintains balance in high pressure applications to which the present invention has particular application. The seal wedge 24 as in U.S. Pat. No. 4,482,194 is positioned radially so as to be substantially flush at its outer periphery with step portion 22b of the labyrinth preseal bushing 22 and the outer periphery of the outer annular rotating seal race 26 to prevent excessive pressure buildup behind the rotating seal race 26 by eliminating the square inch surface area exposed to external fluid pressure. Further the gap between the counter bore 44 of cartridge 20 and the outer periphery of the annular rotating seal race 26 forms a portion of the labyrinth preseal portion 80 leading to the dynamic seal defined by the opposing contacting end faces of seal races 26 and 28. Further, counter bore 44 of the recessed portion 22c of the labyrinth preseal bushing 22 which is spaced from the inner periphery of the annular rotating seal race 26 is provided with an annular groove 82 which contains a further O-ring seal 84 whose diameter is such that it is compressed against the inner periphery of rotating annular seal race 26 to form a further positive pressure fluid seal preventing ingress of fluid medium of a corrosive nature or otherwise to the interior of housing 12 at this point.

The axial length of the annular rotating seal race 26 is such that there is a fairly large axial gap 86 between the axially outer end face 26b of the annular rotating seal race 26 and an axial end face or shoulder 88 between labyrinth preseal bushing step portions 22b, 22c.

In like fashion to U.S. Pat. No. 4,482,194, the annular rotating seal race 28 is resiliently coupled to the labyrinth preseal bushing 20 by the seal wedge 24. Further, the seal wedge 24 may be formed of rubber or like elastomeric material. It is annular in form and oval or diamond shaped in cross-sectional configuration in the manner of the referred-to patent. Shoulder 88 of bushing 22 is provided with an annular groove 90 of generally V-shaped cross section which groove faces a similar sized and configured groove 92 within the outer end face 26b of the annular rotating seal race 26. Opposite axial ends of the seal wedge 24 as at 24a, 24b fit into respective grooves 90, 92 under compressive distortion of the seal wedge.

Unlike the seal wedge of U.S. Pat. No. 4,482,194, it is not the seal wedges primary function to compressably press the annular rotating seal race 26 against the opposing seal face 28b of the annular static seal race 28. In this case, the seal wedge 24 is not a solid elastomeric member, it includes an annular groove or slot of rectangular configuration circumferentially through the center of the seal wedge 24, as at 24c, from the radial inner side 24d towards the radially outer side 24e, but terminating short thereof to form a thin connecting portion 24f which joins opposite axial ends 24a, 24b. Further, interposed between radial shoulder 88 of bushing 22 and axial end face 26b of the annular rotating seal race 26 is an annular metal spring indicated generally at 100. In the form shown, spring 100 is a wave spring formed of spring steel stock including axial undulations such that there are axial portions 100a which contact the sidewall of annular groove 24c proximate to end 24a of the seal wedge and, axially offset portions 100b which contact the sidewall of the annular radial groove slot 24c which is proximate to the opposite end 24b of that seal wedge. Further, the radial width of the annular wave spring 100 is such that its radial width is in excess of depth of the annular groove 24c so that the wave spring acts not only on the opposite ends of the seal wedge 24a, 24b but also acts on shoulder 88 of bushing 22 and end face 26b of the annular rotating seal race 26. The effect of this is that the wave spring 100 provides an axial biasing force tending to maintain contact between opposed ends 26a of the annular static seal race 26 and opposing end face 28b of the annular static seal race 28. At the same time, force is exerted on the compressed resilient elastomeric material of the seal wedge 24 maintaining the physical coupling between the bushing 22 and the annular rotating seal race 26.

The existence or the use of the axial wave spring 100 permits a compressive force to be set up to maintain the seal between opposed end faces 26a and 26b of respective annular rotating seal race 26 and annular static seal race 28, respectively. Such spring 100, alone would have the serious disadvantage of permitting contaminants to enter the space or gap 89 between the bushing and the annular rotating seal race 26. By installing the wave spring within radial groove 24c of the seal wedge, the anti-clogging advantage of the seal wedge is retained via the thin connecting strip 24f of the wedge 24 while the unique interaction of the two devices yields the ultimate combined advantage of a single assembly. Those advantages include the extended life of the seal faces 26a, 28b due to the reduced friction therebetween, and utilization of a wave spring to provide an adequate but reduced bias to maintain the dynamic seal across the interface between end faces 26a, 28b of respective members. Further, the improved rotary seal results in less energy consumption on the motor driving the comminutor or like device using the rotary seal due to decreased drag of the seal faces 26a, 28b. The arrangement further results in reduced costs in manufacturing of seal races by increasing the tolerance allowance in the height of the races 26, 28. Further, due to the presence of the wave spring in combination with the seal wedge 24, the resultant seal is capable of accepting a greater amount of shaft deflection for shaft 10 while still maintaining the dynamic seal face contact without the seal faces 26a, 28b opening up. Further, the composite wave spring and elastomeric sledge wedge assembly overcomes problems associated with compression set in said elastomeric materials forming the seal wedge 24, allowing elastomers of various stiffness to be employed thereby maintaining its springiness over the life of the seal. Additionally, this permits a variation in the type of elastomeric material forming the seal wedge 24 which overcomes problems of stiffness in elastomeric material such as fluorocarbons.

The assembly consisting of the seal wedge 24 and the wave spring 100 offers a mechanical compression advantage of a metal spring yet, by having the wave spring installed within the inside diameter groove 24c of the elastomeric seal wedge, the anti-clogging advantage of the runner seal wedge. Wedge 24 completely fills the opposed V-grooves 90, 92 of the labyrinth preseal bushing 22 and the annular rotating seal race 26, respectively, and the bridge 24f across the gap 89 therebetween retains the anti-clogging advantage which would be a serious disadvantage. Further, the combination is achieved without the necessity of or adding to the extremely limited seal space allotment for the seal assembly within the apparatus such as comminutors to which the rotating seal has particular application.

In the fluid pressure assisted rotary shaft seal assembly of U.S. Pat. No. 4,482,194, the solid elastomeric (rubber) seal wedge is required to perform several functions including by way of its compression the application of the desired biasing force on the annular rotating seal race 26 to maintain the dynamic seal at the interface between opposing seal race faces of the annular rotating seal race and the annular static seal race, and the provision of a positive fluid seal within the gap between the axial end face of the annular rotating seal race and the axially space labyrinth preseal bushing across which gap the solid seal wedge bridges. Further, the resilient coupling of the annular rotating seal wedge to the labyrinth preseal bushing insures rotation of the annular seal race with the bushing to which the bushing is fixedly coupled. Thus, the solid seal wedge functions as in U.S. Pat. No. 4,482,194 as a rubber, non-clogging spring, while performing a drive function from the bushing to rotating seal race backed by the positive engagement of lobes, borne by the labyrinth preseal bushing.

As stated previously, while the use of a solid seal wedge permits operation of the rotary seal assembly at relatively low speeds and under relatively low pressure conditions highly suitable to the grinding of sewage or the like when the seal was used in a comminutor, attempts to employ the same comminutor operating at high speed and under high pressure conditions results in excessive heat at the seal interface between the two seal races, the formation of cracks within the rubbing surface of one or both dynamic seal races, a deformation set to the seal wedge itself and unacceptable leakage across the seal assembly.

However, to the contrary, by utilizing the seal wedge having an annular central groove within the radial side face remote from the exterior corrosive fluid and by utilizing a mechanical spring 100 (wave spring, coil spring, Belleville spring, or the like) which provides the desired spring biasing force to set up and maintain the seal between the two dynamic seal races while assisting in maintaining the groove seal wedge in position with its opposite axial ends within the respective V-shaped groove of the bushing and annular rotating seal race, the elastomeric material forming the seal wedge may be much more pliable. Thus, a softer rubber having a shore hardness of 30 to 40 was found to insure a complete seal at high speed and under relatively high pressure without significant deformation to the seal wedge or change in configuration over time while under these operating parameters. Four tests were undertaken to determine the effectiveness of radial grooved seal wedge and wave spring assembly as shown in the drawing in contrast to the solid rubber seal wedge of U.S. Pat. No. 4,482,194 in a sewage grinder manufactured and sold commercially under Applicant's corporate assignee trademark "MUFFIN MONSTER" was employed. In the first two tests a solid seal wedge of hard rubber having a Shore hardness of approximately 40 was employed having a free length of 0.673 inch and provided with an axial compression increasing in step from 0.005 inch to 0.20 inch compression with corresponding annular rotating seal race load. Parameters determined included the spring rate of the spring, the set of the rubber spring after testing, seal leakage and face wear condition after test, as follows:

Test Conditions

Pressure—50 psig
Fluid—water
Temperature—ambient 60° F. to 90° F.
Speed—1800 rpm
Flush—2-3 gpm
Durations—50 hrs/min
Seal Setting—0.015" compression of rubber spring (seal wedge)

Tester

The tester used for this invention is a closed circuit system which utilized automatic fluid supply and pressure control. Built into the system is a circulating pump to provide a positive flush, a heater and heat exchanger for temperature control and all the necessary instrumentation required to effectively monitor the test while in progress.

The test seals were mounted in the test fixture's outboard end a similar size Borg Warner mechanical seal was mounted in the test fixtures inboard end. The inner seal acted to close the "stuffing box". The outer test seal was easily accessible and could be directly monitored while the test was in progress.

SOLID ELASTOMER SEAL WEDGE

Testing

Two tests were conducted with two different sets of Disposable Waste Systems solid seal wedge. Prior to installing the seals in the tester, the rotating face and rubber spring were measured and load tested (see Spring Load Test Results, below).

The seals were installed in the outboard end of tester #8 with 0.015" compression. This provided approximately 7½ psi face load for test #1 and 12½ psi face load for test #2. The system was then filled with water and bled of all air.

Test 1

Static—50 psgi, 60° F. Leakage—Weeping
Start—50 psgi, 60° F. Leakage—70 cc/minute This test #1 ran a total of 40 hours. Within the first 2 hours the leakage increased to about 400 cc/minute. During the balance of the test the leakage was as much as 940 cc/minute and as little as 380 cc/minute. After 40 hours the test was discontinued, a new set of seals was installed and test #2 began.

Test 2

Static—50 psig, 60° F. Leakage not noted
Start—50 psig, 64° F. Leakage—80 cc/minute This test #2 ran a total of 72 hours. Within the first hour the leakage stabilized at approximately 100 cc/minute and for most of the test leakage remained at this level. During the last 20 hours the leakage slowed and leveled at 7 cc/minute. The test was discontinued at 72 hours, and all parts were then inspected.

Results

Test #1 was discontinued because the leakage levels were above reasonable levels. Inspection of the faces revealed that the stationary face tungsten had cracked. The crack exhibited itself across the entire face, completely through the part and in line with the edge of the drive slots.

To confirm the results of test #1, test #2 was conducted. Test #2 started and ran with more reasonable leakage levels. Near the end of the test, the leakage began to drop into the acceptable range for a seal of this size, so the test was continued another 20 hours. During this time the leakage remained constant and below 10 cc/minute.

After 72 hours test #2 was stopped and the seal faces inspected. The stationary face was cracked in the same manner as in test #1.

Face wear was not measured due to the cracked faces.

SPRING LOAD TEST RESULTS

Face Set #1
Before Test
  Free Length=0.673"
    0.005" Compression=1.5#
    0.010" Compression=6.5#
    0.015" Compression=8.0#
    0.020" Compression=14.0#
After Test
  Free Length=0.673"
    0.005" Compression=2#
    0.010" Compression=7#
    0.015" Compression=9#

0.020" Compression=14#
Face Set #2
  Before Test
    Free Length=673"
      0.005" Compression=2#
      0.010" Compression=7#
      0.015" Compression=13#
      0.020" Compression=19#
  After Test
    Free Length=0.673"
      0.005" Compression=2#
      0.015" Compression=13#
      0.020" Compression=19#

CONCLUSION

The conclusion was reached that using the solid hard rubber seal wedges, such seals are not suitable for use at 50 psig and 1800 rpm. Although the leakage near the end of test #2 looked encouraging, it was found that the stationary face cracked at the end of both tests.

Tests 3 and 4

Similar test #3 and #4 were conducted on the wave spring and seal wedge assembly of the present invention as shown and described as applied to the same test set up.

Test Conditions

Fluid—water
Pressure—50 and 100 psi
Temperature—ambient
Speed—1800 rpm
Flush—2-3 gpm
Duration—120 and 42 hrs.
Seal Setting—0.015 inch
Face Load—10.0 psi

WAVE SPRING SEAL WEDGE

Testing

Test #3 ran for 120 hours without a trace of leakage. The faces were inspected and found to have a number of very small heat checks around the entire face. Heat checking on the rotating face was more severe than on the stationary face. No major cracks were found. Face wear was 15-30 micro inches maximum at the stationary face I.D. Average wear was about 15 micro inches, or $1.2 \times 10^{-6}$ inches/hour.

Results of the test #4 at 100 psi were identical to test #3. No leakage occurred, and very small heat checks formed.

The faces were lapped following the that test, but some of the heat checks were still visible.

Formation of the heat checks may have assisted in lubricating the faces thereby minimizing face wear.

CONCLUSION

With the new seal installed, it is apparent that the combination of a wave spring fitted radial grooved seal wedge, the softer resilient elastomeric material provides complete sealing, with low wear and low friction loss at high speed and high pressure across the dynamic seal races greatly increasing the application range of an apparatus such as grinder or utilizing the improved rotary seal assembly.

Further, like U.S. Pat. No. 4,482,194 the improved rotary shaft seal is structured to provide seal balance and the surfaces exposed to the sealing medium allow the pressure in the system to automatically provide the additional closing pressure on the seal faces other than that exerted by the bias of the wave spring or its equivalent acting through and in conjunction with the bias of the compressed slotted seal wedge 24.

While the invention has been described in detail and with reference to a specific embodiment thereof, it will apparent to one skilled in the art that various changes and modifications can be made therein without departing from the spirit and scope of the invention.

We claim:

1. In a fluid pressure assisted rotary shaft seal assembly for sealing a shaft supported for rotation about its axis within a housing bore by an anti-friction bearing interposed between the shaft and the housing bore, said bearing having an outer bearing race fixed to said housing and an inner bearing race fixed to the shaft and rotating therewith, said seal assembly comprising:

an annular bushing operatively fixed to said shaft adjacent the anti-friction bearing on the high pressure side of the housing, an annular static seal race operatively fixed to said housing and having axially opposed end faces, an annular rotating seal race operatively coupled to said shaft and having an end face sealably engageable with one opposing end face of said static seal race, a replaceable wear sleeve cartridge fixedly mounted to said housing bore, being concentric to said annular bushing over at least a portion of its length and being spaced therefrom to define an annular cavity therebetween to the side of the anti-friction bearing, said static seal race being mounted within said cavity and rotatably fixed to said replaceable wear sleeve cartridge, means including said bushing and said cartridge defining a labyrinth preseal exterior of said housing, means including said replaceable wear sleeve cartridge, said annular bushing and said seal races defining a positive fluid pressure seal internally of said cavity for preventing any exterior fluid medium from penetrating the interior of the housing through said assembly, said bushing including a reduced diameter portion defining a radially projecting shoulder functioning as a radial end wall of said cavity, and an elastomeric seal wedge interposed axially between said bushing shoulder and said annular rotating seal race, and wherein the axial length of the cavity, said seal races and said wedge are such that said seal wedge is placed under axial compression to resiliently bias confronting end faces of the seal races into sealing contact with each other, the improvement further comprising: an annular radial groove within said annular elastomeric seal wedge on a radial face thereof opposite that open to the housing exterior, and an annular mechanical spring under axial compression interposed within said annular radial groove of said annular elastomeric seal wedge for exerting mechanical spring compressive force through said seal wedge toward opposite axial ends of said annular elastomeric seal wedge to facilitate the maintenance of the positive fluid pressure seal by said seal wedge between said annular bushing and said rotating seal ring and the resilient biasing of the confronting end faces of the seal races into dynamic seal contact with each other.

2. The rotary shaft seal assembly as claimed in claim 1 wherein said annular mechanical compression spring is of a radial width in excess of the depth of the said radial groove within said annular elastomeric seal wedge whereby a portion of said annular mechanical compression spring makes direct contact with said bushing radially projecting shoulder and the opposing face of said rotating seal race bearing said annular elastomeric seal wedge to compressably bias said rotating seal race away from said bushing radial shoulder.

3. The rotary shaft seal assembly as claimed in claim 1 wherein said radially projecting shoulder of said bushing includes an annular groove of V-shaped cross section, the axial end face of said rotating seal race facing said bushing radially projecting shoulder carries a radially aligned V-shaped annular groove corresponding in size to that of said bushing shoulder and wherein said seal wedge is of diamond shaped radial cross section having seal wedge halves fitted respectively into said V-shaped grooves of said bushing shoulder and said rotating seal axial and face respectively.

4. The rotary shaft seal assembly as claimed in claim 1 wherein said annular mechanical compression spring consists of a metal wave spring having axial undulations alternatively contacting said bushing radially projecting shoulder and said axial end face of said annular rotating seal race.

5. The rotary shaft seal assembly as claimed in claim 1 wherein said elastomeric seal wedge is formed of rubber having a Shore hardness ranging from 30 to 40.

6. In a fluid pressure assisted rotary shaft seal assembly for sealing a shaft supported for rotation about its axis within a housing bore by an anti-friction bearing interposed between the shaft and the housing bore, said bearing having an outer bearing race fixed to said housing and an inner bearing race fixed to said shaft and rotating therewith, said seal assembly comprising:

an annular bushing operatively fixed to said shaft adjacent the anti-friction bearing on the high pressure side of the housing, an annular static seal race operatively fixed to said housing and having axially opposed end faces, an annular rotating seal race operatively coupled to said shaft and having an end face sealably engageable with one opposing end face of said static seal race, a means including at least said annular bushing and said seal races for defining a positive fluid pressure seal for preventing any exterior fluid medium from penetrating the interior of the housing through said assembly, said bushing including a reduced diameter portion defining a radially projecting shoulder functioning as a radial end wall facing said annular rotating seal race, and an elastomeric seal wedge interposed axially between said bushing shoulder and said annular rotating seal race and means for placing said elastomeric seal wedge under axial compression to resiliently bias the confronting end faces of the seal races into sealing contact with each other with same seal wedge forming a part of said positive fluid pressure seal, the improvement further comprising:

an annular radial groove within said annular elastomeric seal wedge on a radial face thereof opposite that open to the housing exterior, and an annular mechanical spring under axial compression interposed within said annular radial groove of said annular elastomeric seal wedge for exerting mechanical spring compressive force through said seal wedge towards opposite axial ends of said annular elastomeric seal wedge to facilitate maintenance of the positive fluid pressure seal by said seal wedge between said annular bushing and said rotating seal ring and for resiliently biasing the confronting end faces of seal races into a dynamic seal contact with each other.

7. The rotary shaft seal assembly as claimed in claim 6 wherein said annular mechanical compression spring is of a radial width in excess of the depth of the said radial groove within said annular elastomeric seal wedge whereby a portion of said annular mechanical compression spring makes direct contact with said bushing radially projecting shoulder and the opposing face of said rotating seal race bearing said annular elastomeric seal wedge to compressably bias said rotating seal race away from said bushing radial shoulder.

8. The rotary shaft seal assembly as claimed in claim 6 wherein said radially projecting shoulder of said bushing includes an annular groove of V-shaped cross section, the axial end face of said rotating seal race facing said bushing radially projecting shoulder carries a radially aligned V-shaped annular groove corresponding in size to that of said bushing shoulder, and wherein said seal wedge is of diamond shaped radial cross section having seal wedge halves fitted respectively into said V-shaped grooves of said bushing shoulder and said rotating seal axial end face respectively.

9. The rotary shaft seal assembly as claimed in claim 6 wherein said annular mechanical compression spring consists of a metal wave spring having axial undulations alternatively contacting said bushing radially projecting shoulder and said axial end face of said annular rotating seal race.

10. The rotary shaft seal assembly as claimed in claim 6 wherein said elastomeric seal wedge is formed of rubber having a Shore hardness ranging from 30 to 40.

* * * * *